United States Patent
Janik et al.

(10) Patent No.: US 12,505,358 B2
(45) Date of Patent: Dec. 23, 2025

(54) METHODS AND SYSTEMS FOR APPROXIMATING EMBEDDINGS OF OUT-OF-KNOWLEDGE-GRAPH ENTITIES FOR LINK PREDICTION IN KNOWLEDGE GRAPH

(71) Applicant: Accenture Global Solutions Limited, Dublin (IE)

(72) Inventors: Adrianna Janik, Dublin (IE); Sumit Pai, Dublin (IE); Luca Costabello, Newbridge (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1091 days.

(21) Appl. No.: 17/514,512

(22) Filed: Oct. 29, 2021

(65) Prior Publication Data

US 2023/0132545 A1 May 4, 2023

(51) Int. Cl.
  *G06N 3/094* (2023.01)
  *G06F 18/2135* (2023.01)
  *G06N 5/02* (2023.01)
  *G06N 5/022* (2023.01)

(52) U.S. Cl.
  CPC ......... *G06N 5/022* (2013.01); *G06F 18/2135* (2023.01)

(58) Field of Classification Search
  CPC .......................... G06N 5/022; G06F 18/2135
  See application file for complete search history.

(56) References Cited

U.S. PATENT DOCUMENTS

| | | | |
|---|---|---|---|
| 10,157,226 B1* | 12/2018 | Costabello | G06N 5/022 |
| 10,877,979 B2 | 12/2020 | Costabello et al. | |
| 2019/0205964 A1* | 7/2019 | Onoro Rubio | G06N 3/084 |
| 2019/0220524 A1* | 7/2019 | Costabello | G06F 16/24578 |
| 2021/0103826 A1 | 4/2021 | Gueret et al. | |

OTHER PUBLICATIONS

Kazemi, Seyed Mehran and David Poole, "SimplE Embedding for Link Prediction in Knowledge Graphs", 2018, NeurIPS, pp. 2 and 3 (Year: 2018).*

(Continued)

*Primary Examiner* — Andrew J Jung
*Assistant Examiner* — Skylar K Vanwormer
(74) *Attorney, Agent, or Firm* — Mannava & Kang, P.C.

(57) ABSTRACT

The present disclosure describes methods and systems for generating an approximated embedding of an out-of-knowledge-graph entity based on a knowledge graph. The method includes: receiving a target entity, a dataset associated with the target entity, and an embeddings space of a knowledge graph comprising a set of structured data, wherein the target entity is out of the knowledge graph and the embeddings space includes a set of vectors representing the set of structured data in the embeddings space; selecting a set of elements from the knowledge graph, each element being related to the target entity according to the dataset associated with the target entity; constructing a set of descriptory triples based on the target entity and the set of elements; obtaining an embedding matrix based on the descriptory triples and the embeddings space; and generating an approximated embedding for the target entity based on the embedding matrix.

17 Claims, 8 Drawing Sheets

(56) References Cited

OTHER PUBLICATIONS

Bi, Zhongqin, Tianchen Zhang, Ping Zhou and Yongbin Li, "Knowledge Transfer for Out-of-Knowledge-Base Entities: Improving Graph-Neural-Network-Based Embedding Using Convolutional Layers", Sep. 2020, pp. 159042-159044 (Year: 2020).*

Ji, Guoliang, Shizhu He, Liheng Xu, Kang Liu and Jun Zhao, "Knowledge Graph Embedding via Dynamic Mapping Matrix", Association for Computational Linguistics, p. 690 (Year: 2015).*

Extended European Search Report regarding EP 22 19 8858 dated Mar. 14, 2023, 9 pages.

Albooyeh et al., "Out-of-Sample Representation Learning for Knowledge Graphs," Montreal, Canada, October 23, 2020, 10 pages.

Baek et al., "Learning to Extrapolate Knowledge: Transductive Few-shot Out-of-Graph Link Prediction," 34th Conference on Neural Information Processing Systems NeurIPS 2020, Vancouver, Canada, 21 pages.

Hamaguchi et al., "Knowledge Transfer for Out-of-Knowledge-Base Entities: A Graph Neural Network Approach," Nara Institute of Science and Technology, Ikoma, Nara, Jagan Recruit Institute of Technology, 7 pages.

Bose et al., "Meta-Graph: Few Shot Link Prediction Via Meta Learning," McGill University, Montreal, 15 pages.

\* cited by examiner

100 receiving, by a reception circuitry, a target entity, a dataset associated with the target entity, and an embeddings space of a knowledge graph comprising a set of structured data, wherein the target entity is out of the knowledge graph and the embeddings space includes a set of vectors representing the set of structured data associated with the knowledge graph in the embeddings space; 110 selecting, by a selection circuitry, a set of elements from the knowledge graph, each element being related to the target entity according to the dataset associated with the target entity; 120 constructing, by a construction circuitry, a set of descriptory triples based on the target entity and the set of elements; 130 obtaining, by an aggregation circuitry, an embedding matrix based on the descriptory triples and the embeddings space; 140 generating, by an approximator circuitry, an approximated embedding for the target entity based on the embedding matrix. 150

FIG. 1

1  $e$ — entity, $t(s,p,o)$ — triple(subject, predicate, object);
2  $s\_triples(e) \leftarrow \forall t(s,p,o) \in KG : s == e$;
3  $o\_triples(e) \leftarrow \forall t(s,p,o) \in KG : o == e$;
4  $descriptory\_triples(e) \leftarrow o\_triples(e) \cup s\_triples(e)$;
5  $O(e,M) \leftarrow (embed_M(s), embed_M(p)) : \forall s : ((p,s) \in o\_triples(e));$
6  $S(e,M) \leftarrow (embed_M(p), embed_M(o)) : \forall o : ((p,o) \in s\_triples(e));$
7  $NEM$ - Neighbourhood Embedding Matrix;

8  $NEM(e,M) \leftarrow \begin{bmatrix} S(e,M) \\ O(e,M) \\ padding \end{bmatrix}$ 9  [OPTIONAL] if $M$ not provided $M \leftarrow$ train KGE model on $KG$;
10  for $e$ in $KG\_entities$ do
11-1  $\quad KG_e \leftarrow KG - descriptory\_triples(e)$
11-2  $\quad M_e \leftarrow$ Train KGE model on $KG_e$
11-3  $\quad X,y \leftarrow NEM(e,M_e), embed_M(e) \forall e \in KG_e$
11-4  $\quad y == Approximator(X);$
12  $\quad C \leftarrow min(error(Approximator(e), embed_M(e))) : \forall e \in KG_e;$
13  $\quad$ Optimize Approximator subject to the criterion $C$;
14  return Approximator

FIG. 7

METHODS AND SYSTEMS FOR APPROXIMATING EMBEDDINGS OF OUT-OF-KNOWLEDGE-GRAPH ENTITIES FOR LINK PREDICTION IN KNOWLEDGE GRAPH

FIELD OF THE INVENTION

The present disclosure relates in general to the fields of knowledge graph predictive analytics such as predicting new facts from machine learning models applied to knowledge graphs, and in particular to methods and systems for generating approximated embedding vector representations of concepts not included in a knowledge graph (i.e., out-of-knowledge-graph entities).

BACKGROUND

Data stored in a knowledge graph format may be organized to reflect relations between specific concepts within the knowledge graph. Traditional approaches for discovering information from a knowledge graph have not considered solutions for discovering new facts that do not have an existing relationship within the knowledge graph.

The present disclosure describes various embodiments of machine learning models for providing predictive analytics based on knowledge graphs. The machine learning process supporting the prediction may be optimized and improved towards generating an approximated embeddings of out-of-knowledge-graph entities.

SUMMARY

The present disclosure describes an example computing device for generating an approximated embedding of an out-of-knowledge-graph entity based on a knowledge graph and its embeddings. The computing device includes a reception circuitry configured to receive a target entity, a dataset associated with the target entity, and an embeddings space of a knowledge graph comprising a set of structured data, wherein the target entity is out of the knowledge graph and the embeddings space includes a set of vectors representing the set of structured data associated with the knowledge graph in the embeddings space. The computing device also includes a selection circuitry configured to select a set of elements from the knowledge graph, each element being related to the target entity according to the dataset associated with the target entity; a construction circuitry configured to construct a set of descriptory triples based on the target entity and the set of elements. The computing device further includes an aggregation circuitry configured to obtain an embedding matrix based on the descriptory triples and the embeddings space, and an approximator circuitry configured to generate an approximated embedding for the target entity based on the embedding matrix.

The present disclosure describes a method for generating an approximated embedding of an out-of-knowledge-graph entity based on a knowledge graph and its embeddings. The method includes receiving, by a reception circuitry, a target entity, a dataset associated with the target entity, and an embeddings space of a knowledge graph comprising a set of structured data, wherein the target entity is out of the knowledge graph and the embeddings space includes a set of vectors representing the set of structured data associated with the knowledge graph in the embeddings space. The method also includes selecting, by a selection circuitry, a set of elements from the knowledge graph, each element being related to the target entity according to the dataset associated with the target entity; constructing, by a construction circuitry, a set of descriptory triples based on the target entity and the set of elements. The method further includes obtaining, by an aggregation circuitry, an embedding matrix based on the descriptory triples and the embeddings space; and generating, by an approximator circuitry, an approximated embedding for the target entity based on the embedding matrix.

The present disclosure describes a non-transitory, computer-readable storage medium storing computer-readable instructions. The computer-readable instructions, when executed by a processor, are configured to cause the processor to perform: receiving a target entity, a dataset associated with the target entity, and an embeddings space of a knowledge graph comprising a set of structured data, wherein the target entity is out of the knowledge graph and the embeddings space includes a set of vectors representing the set of structured data associated with the knowledge graph in the embeddings space; selecting a set of elements from the knowledge graph, each element being related to the target entity according to the dataset associated with the target entity; constructing a set of descriptory triples based on the target entity and the set of elements; obtaining an embedding matrix based on the descriptory triples and the embeddings space; and generating an approximated embedding for the target entity based on the embedding matrix.

BRIEF DESCRIPTION OF THE DRAWINGS

The foregoing and other objects, features, and advantages for embodiments of the present disclosure will become apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

FIG. 1 is a flow diagram illustrating an example of a method implemented by an exemplary system, in accordance with certain embodiments of the present disclosure.

FIG. 7 shows an algorithm for generating an embedding approximator in accordance with certain embodiments of the present disclosure.

DETAILED DESCRIPTION

Figure 2:
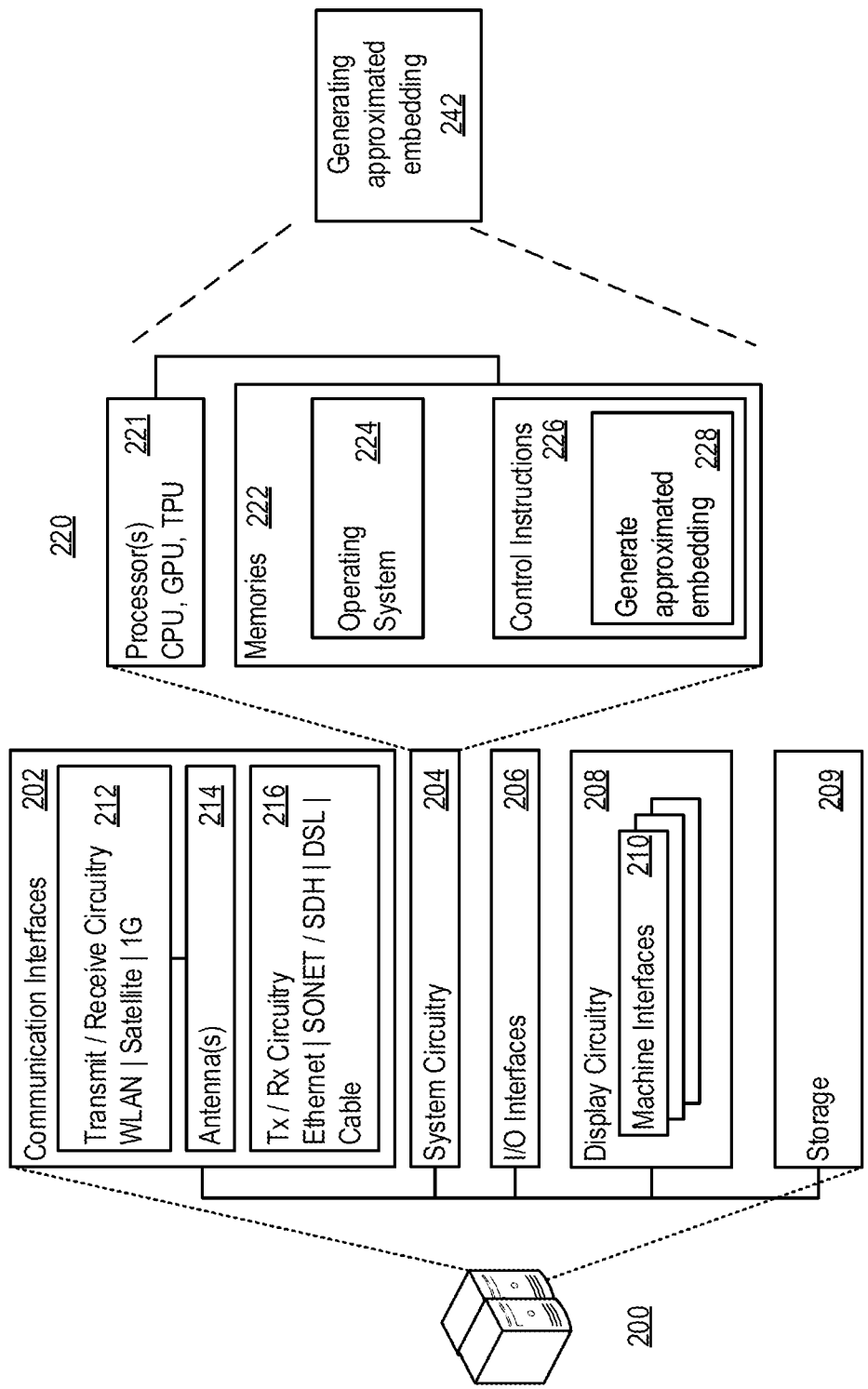
FIG. 2 is a block diagram illustrating an embodiment of a computer architecture for a device for implementing the method in FIG. 1, in accordance with certain embodiments of the present disclosure.

Reference will now be made in detail to the embodiments of the present disclosure, examples of which are illustrated in the accompanying drawings, which form a part of the present disclosure, and which show, by way of illustration, specific examples of embodiments. Please note that the disclosure may, however, be embodied in a variety of different forms and therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, application program interface (API), firmware or any combination thereof.

Throughout the specification and claims, terms may have nuanced meanings suggested or implied in context beyond an explicitly stated meaning. Likewise, the phrase "in one embodiment", "in some embodiments", "in one implementation", or "in some implementations" as used herein does not necessarily refer to the same embodiment(s) or implementation(s) and the phrase "in another embodiment", "in some other embodiments", "in another implementation", or "in other implementations" as used herein does not necessarily refer to different embodiment(s) or implementation(s). It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure may be embodied in various forms, including a system, a method, a computer readable medium, or a platform-as-a-service (PaaS) product for generating approximated vector representations of concepts not included in a knowledge graph (i.e., out-of-knowledge-graph entities) in an embeddings space of the knowledge graph. Datasets included in the knowledge graph may be used to train a link predictor operated in the embeddings space for predicting links between known entities in the knowledge graph. The approximated vectors of out-of-knowledge graph entities as generated by the disclosed method and system herein may be provided to the trained link predictor to infer predicted links connected to the approximated out-of-knowledge-graph concepts.

Particularly under some circumstances, a new triple associated with the knowledge graph may include an entity not represented in the embeddings space of a knowledge graph (i.e., an unknown entity or an unseen entity), but it may be desirable to be able to predict how it connects to the rest of the known knowledge graph. One of the problems/issues associated with standard knowledge graph embedding (KGE) models (e.g., TransE, ComplEx, etc.) may be that their design rationale may disallow prediction of plausibility of triples involving unseen entities. However, making predictions for statements containing unseen entities may be crucial. One example is in a medical scenario, where KGEs may be used to predict outcome of treatment for particular patients. The inability of a link prediction model to deliver predictions for unknown patients without expensive retraining may be considered as an application drawback. In these circumstances, upon the availability of new patient data, the existing link predictor utilizing the current KGE model may not predict treatment outcome readily.

Under the above described circumstances, before predicting plausibility of links associated with unknown entities, it may be needed to first approximate an embedding vector in the KGE space for such unknown entity.

The present disclosure describes various embodiments for generating an approximated embedding representation of an out-of-knowledge-graph entity based on a knowledge graph and its embeddings, addressing at least one of the problems/issues discussed above. In current state of art, link prediction for previously unseen entities may be carried out by tabular machine learning models which performs link predictions based on a set of features describing a given entity. A similar capability for KGE models and knowledge graph link predictor constitutes the main subject matter of this disclosure.

A knowledge graph may include a set of entities and relations (links) between these entities represented as a graph. A model for a knowledge graph may be defined by a schema or layout that describes the data structures and their relationships, which may be represented by nodes and edges in the knowledge graph. The knowledge graph may present complex and innovative graphical structures that represent the relevant information in response to a query. In various embodiments, the knowledge graph may represent an underlying knowledge base via graphical representations that correspond to structured data points or entities (represented by nodes), relationships (represented by edges), and/or attributes (represented by node properties or edge properties) with semantic meaning.

The knowledge graph may include one or more graph-based datasets. The graph-based datasets may be stored in the memory and includes associations of the corresponding two nodes, for example, a graph-based dataset may include an association of the first node and the second node. In one implementation, a graph-based dataset may include data records having three parameters, which may be known as a triple: a first entity, a relation, and a second entity, and may be represented as <first entity, relation, second entity>. In another implementation, a triple may include a subject, a predicate, and an object. The predicate represents a relationship between the subject and the object. The triple may be represented as <subject, predicate, object>.

For example, a predicate "HasRelapse" may represent an association between a subject representing a "patient" and an object representing a "relapse." For another example, a predicate "therapyType" may represent an association between a subject representing a "relapse" and an object representing a "PalliativeCare." For another example, a predicate "causes" may represent an association between a subject representing a "gene" and an object representing a "disease."

Optionally in some implementations, a graph-based dataset may include data records having an additional fourth parameter, such as a significance/importance parameter. This fourth parameter may be considered an attribute of the predicate parameter. In some implementations, the fourth parameter may comprise metadata.

In various embodiments, machine learning models may be used to predict plausibility of one or more missing link in a knowledge graph. For example, Patient1234 may be a cancer patient, and machine learning models may be used to predict whether Patient1234 will relapse with respect to the cancer. In one implementation, a target triple may be created as <Patient1234, hasRelapse, Relapse>, and a link prediction sub-system may output a prediction on the plausibility of the target triple. For example, a prediction may be 80%, which may mean that there is 80% probability that Patient1234 will relapse.

In some embodiments, a link prediction sub-system may include a system for assessing plausibility of unknown statements such as triples with unknown entities in a knowledge graph. The link prediction sub-system may include or may be associated with an optimized knowledge graph embeddings (KGE), which include an optimized set of multidimensional vectors representing entities and links of a knowledge graph. The link prediction sub-system may receive a knowledge graph and a target triple as input, and generate a prediction as output.

In some embodiments, a training step may include one or more sub-steps for the generating the link prediction sub-system, and the training may take an amount of time to complete. An inference step may include one or more sub-steps for the link prediction sub-system to predict the target triple, and may take another amount of time as inference or production time.

The present disclosure describes various embodiments for a method, a system, a device, and/or computer-readable medium for generating an approximated embedding of an out-of-knowledge-graph entity based on a knowledge graph and its embeddings. The out-of-knowledge-graph entity may refer to an entity not identifiable in the knowledge graph. In some implementations, the out-of-knowledge-graph entity may be referred as an unknown entity relative to the knowledge graph.

Referring to FIG. 1, the present disclosure describes a method 100 for generating an approximated embedding of an out-of-knowledge-graph entity based on a knowledge graph and its embeddings. The method 100 may include a portion or all of the following: step 110, receiving, by a reception circuitry, a target entity, a dataset associated with the target entity, and an embeddings space of a knowledge graph comprising a set of structured data, wherein the target entity is out of the knowledge graph and the embeddings space includes a set of vectors representing the set of structured data associated with the knowledge graph in the embeddings space; step 120, selecting, by a selection circuitry, a set of elements from the knowledge graph, each element being related to the target entity according to the dataset associated with the target entity; step 130, constructing, by a construction circuitry, a set of descriptory triples based on the target entity and the set of elements; step 140, obtaining, by an aggregation circuitry, an embedding matrix based on the descriptory triples and the embeddings space; and/or step 150, generating, by an approximator circuitry, an approximated embedding vector for the target entity based on the embedding matrix.

FIG. 2 shows an example execution circuitry for implementing the method 100. In one implementation, the execution circuitry may include a computer system 200 for implementing the method 100. In another implementation, the execution circuitry may include a distributed system including more than one computer systems each of which may include a portion or all of the components as the computer system 200 in FIG. 2.

Referring to FIG. 2, the execution circuitry 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CD ROM or DVD drive), serial and parallel bus interfaces, and keyboard and mouse interfaces. The display circuitry 208 may include man-machine interfaces and/or graphical user interfaces (GUI). The GUI may be used to present interfaces and/or options to facilitate model management and/or the execution of other tasks.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol. Additionally or alternatively, the communication interface 202 may support secure information exchanges, such as secure socket layer (SSL) or public-key encryption-based protocols for sending and receiving private data.

The storage 209 may be used to store various initial, intermediate, or final data or model for implementing the method 100 in FIG. 1. These data corpus may alternatively be stored in a database. In one implementation, the storage 209 of the computer system 200 may be integral with the database. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

The system circuitry 204 may support tasks described in the present disclosure, including the drawings and/or claims. In one example, the system circuitry 204 may be implemented as processing circuitry 220 for implementing generating approximated embedding 242, which may provide software support to implement the various tasks performed in the method 100 of FIG. 1. The processing circuitry 220 may include one or more processors 221 and one or more memories 222. The one or more processors 221 may include a portion or all of the following: one or more central processing unit (CPU), one or more graphics processing unit (GPU), and/or one or more tensor processing unit (TPU). The memories 222 stores, for example, control instructions 226 and an operating system 224. The control instructions 226, for example may include instructions for implementing the task of generating approximated embedding 228. In one implementation, the one or more processors 221 execute the control instructions 226 and the operating system 224 to carry out any desired functionality described in the present disclosure. In another implementation, the one or more processors 221 may include a CPU and multiple GPU/TPU to perform one or more steps in method 100.

Continuing with FIG. 2, the memories 222 may further include applications and structures, for example, coded objects, templates, or one or more other data structures to facilitate model management and/or the execution of other tasks.

Figure 3A:
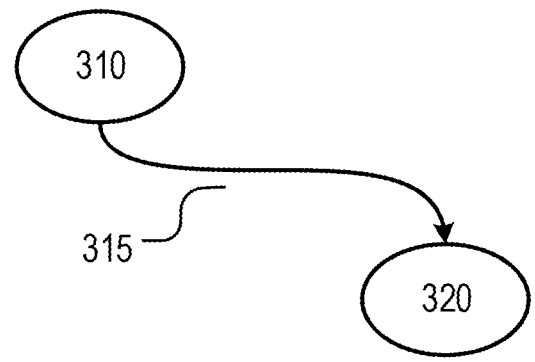
FIG. 3A is an example schematic diagram illustrating a knowledge graph schema, in accordance with certain embodiments of the present disclosure.

Referring to FIG. 3A, an example of a knowledge graph may include a first node 310, a second node 320, and a link 315 between the first node 310 and the second node 320. The link 315 may be a predicate. The first and second nodes (310 and 320) may represent associated objects, respectively. The link or predicate may have a directionality pointing from the first object associated with the first node 310 to the second object associated with the second node 320. In one implementation, the nodes may be referred to as entities, and/or the link may be referred to as relation, predicate, or edge.

Figure 3B:
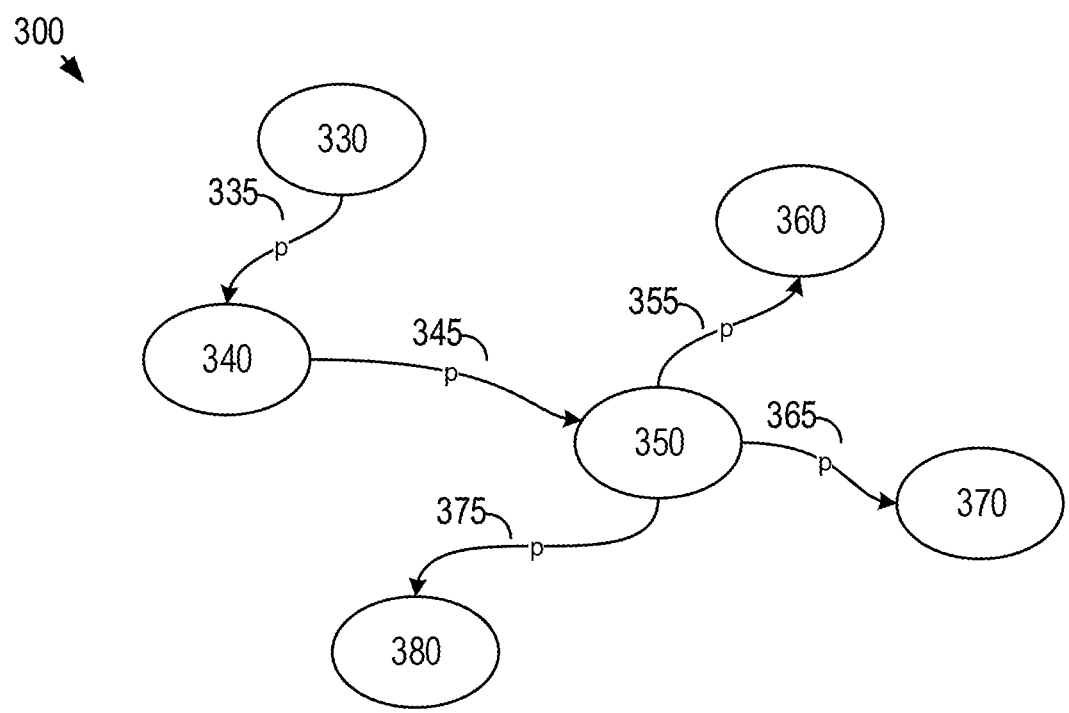
FIG. 3B is another example schematic diagram illustrating a knowledge graph schema, in accordance with certain embodiments of the present disclosure.

Referring to FIG. 3B, another example of a knowledge graph 300 may include a plurality of nodes (330, 340, 350, 360, 370, and 380) and a plurality of links or predicates (335, 345, 355, 365, and 375) between the plurality of nodes.

Figure 4:
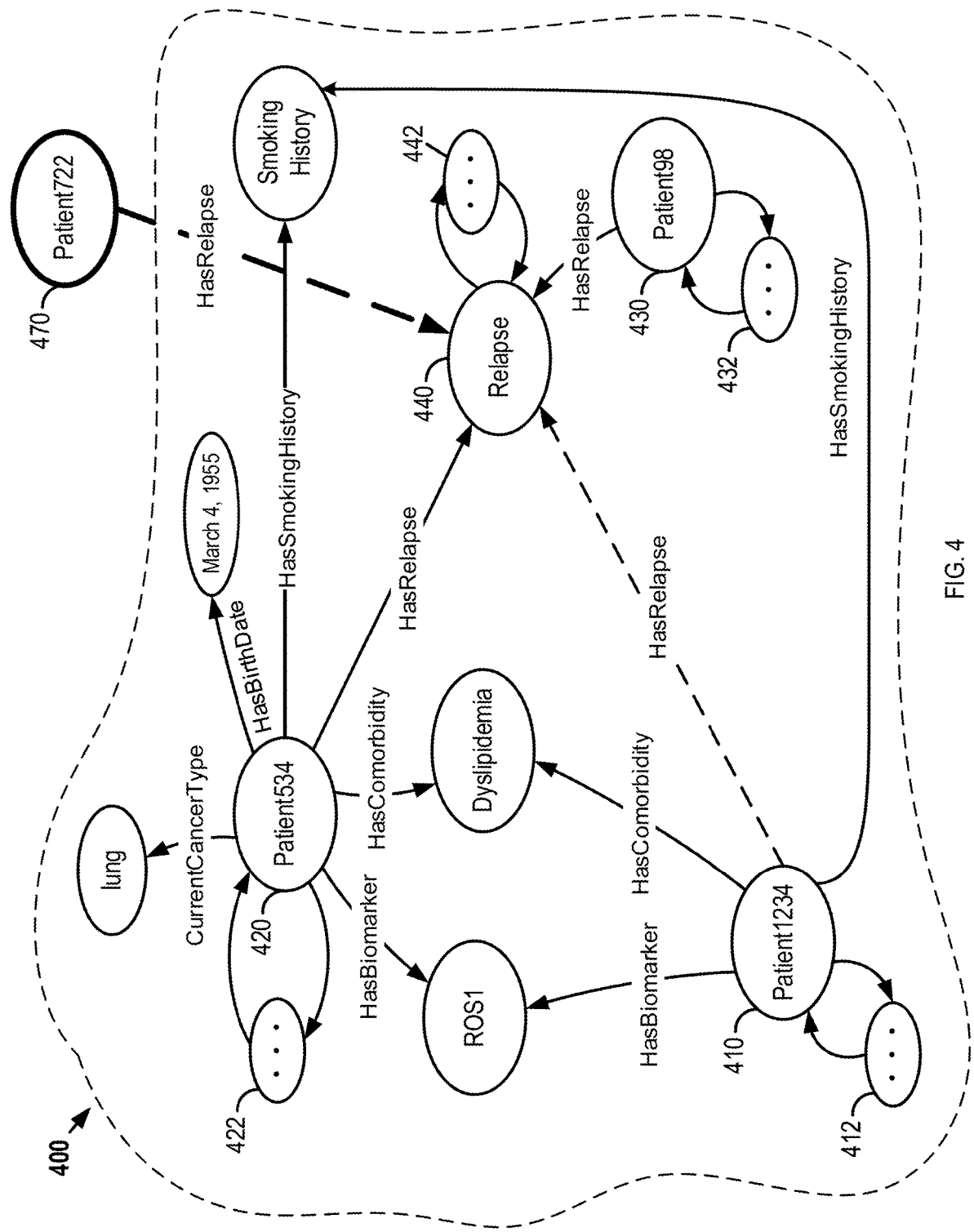
FIG. 4 is an example of a knowledge graph, in accordance with certain embodiments of the present disclosure.

Referring to FIG. 4, in one implementation, a knowledge graph schema 400 is described as an example in accordance with various embodiments of the present disclosure. The schema may provide a manner to express statements about the resources or knowledge base using specific properties that describe the knowledge base. For example, a Resource Description Framework (RDF) may provide a data model that represents the knowledge base in expressions of the form subject-predicate-object. In one implementation, the knowledge base may be expressed by graph-based datasets or triples, which includes one subject, one object, and a link or predicate. The link or predicate may include one or more numerical attributes.

Referring to an example of a knowledge graph 400 shown partially in FIG. 4, under some circumstances, a node 410, as an entity within the knowledge graph, may represent a patient (e.g., Patient1234). In some circumstances, it may be desirable to predict whether Patient1234's cancer will relapse. Under some other circumstances, a node 470, as an entity not part of the knowledge graph, may represent a patient (e.g., Patient722). It may be desirable to also predict whether Patient722's cancer will relapse even though Patient722 is not yet included in the knowledge graph 400.

As part of the knowledge graph 400, a node 420 may represent another patient (e.g., Patient534); and a node 430 may represent yet another patient (e.g., Patient98). A triple of the knowledge graph may include a subject, a predicate, and an object. The subject may denote the resource, and the predicate may denote traits or aspects of the resource and express a relationship between the subject and the object. The knowledge graph may include a target triple of <Patient1234, HasRelapse, Relapse>. In some implementations, a "target" triple may refer to a triple does not belong to an existing knowledge graph, and its plausibility may be predicated by a prediction model.

For example, the node 420 (Patient534) has a relationship of "HasRelapse" to a node 440 ("Relapse"), the node 420 (Patient534) has a relationship of "HasSmokingHistory" to a node "SmokingHistory", the node 420 (Patient534) has a relationship of "HasBirthDate" to a node "Mar. 4, 1955", the node 430 (Patient98) has a relationship of "HasRelapse" to a node 440 ("Relapse"), and the node 410 (Patient1234) has a relationship of "HasSmokingHistory" to a node "SmokingHistory".

There may be other subgraphs to the knowledge graph connecting to one or more nodes in the knowledge graph shown in FIG. 4. These subgraphs may be denoted as ovals with three dots inside, illustrating other subgraphs connected by inwards and outwards links to the entity it is connected to and optionally to other parts of the graph presented in the diagram. For example, a subgraph 412 may connect with the node 410; a subgraph 422 may connect with the node 420; a subgraph 432 may connect with the node 430; and/or a subgraph 442 may connect with the node 440.

There may be standard query on an entity already in the knowledge graph. For example, the Patient1234 (410) is already included in the knowledge graph and a query may be made regarding Patient1234. The standard query may inquire about predicting whether a cancer of Patient1234 will relapse, i.e., <Patient1234, HasRelapse, Relapse>.

Referring to FIG. 4, the new patient, Patient722 (470), may be not included in the knowledge graph, thus Patient722 is new to the knowledge graph and represents an out-of-knowledge-graph entity. The out-of-knowledge-base query may inquire about predicting whether a cancer of Patient722 will relapse, i.e., <Patient722, HasRelapse, Relapse>. Various embodiments in the present disclosure may include methods, systems, computer-readable medium, and devices corresponding to performing the out-of-knowledge-base query.

Figure 5A:
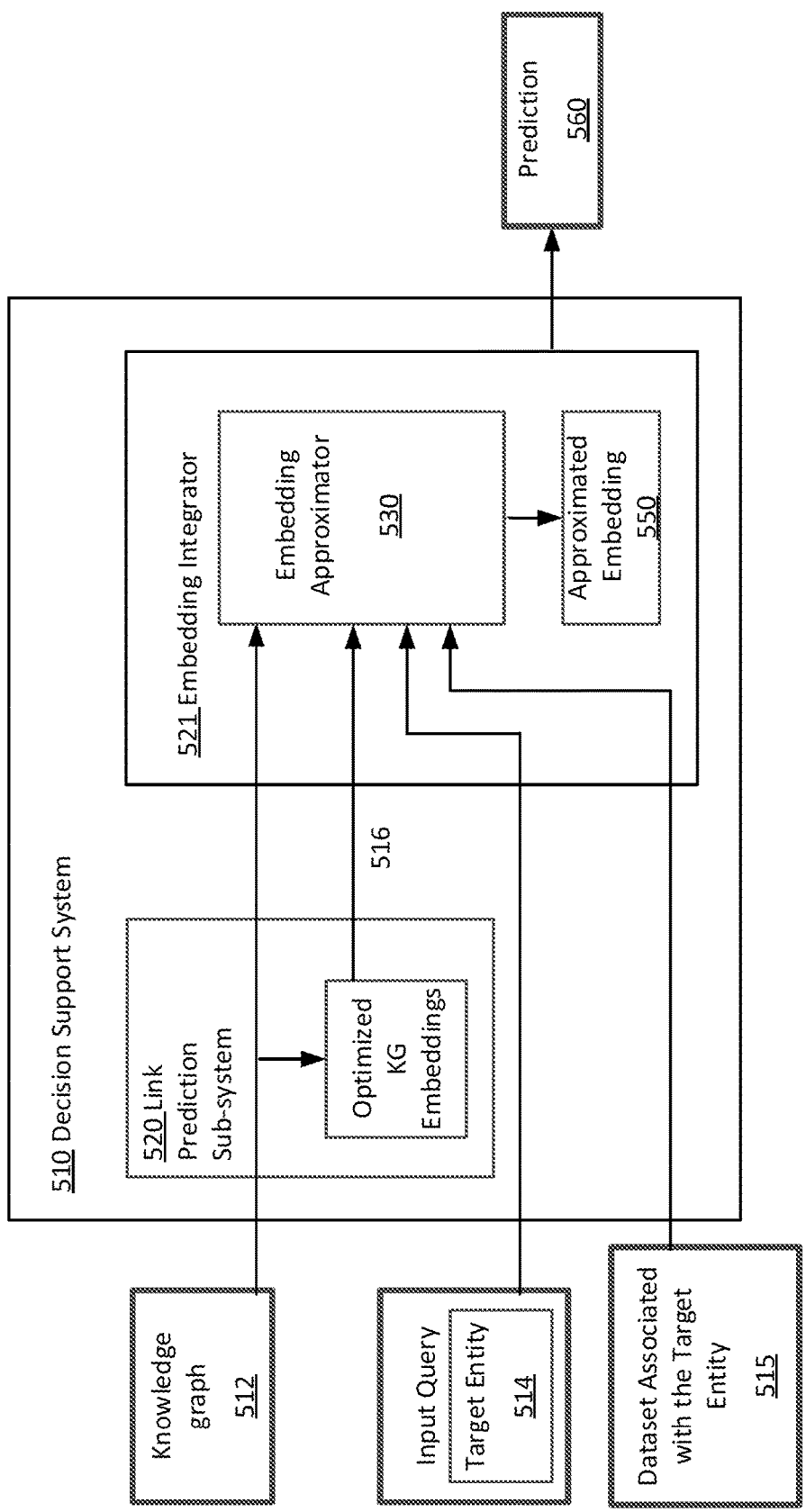
FIG. 5A is a block diagram illustrating an embodiment of a system, in accordance with certain embodiments of the present disclosure.

FIG. 5A shows a schematic diagram for an example embodiment of a link prediction system in the present disclosure. The link prediction system of FIG. 5A may include a decision support system 510. The decision support system 510 may include a link prediction sub-system 520 and/or an embedding integrator (sub-system) 521. The embedding integrator 521 may include an embedding approximator 530 and its output approximated embedding 550. The system or each sub-system may include corresponding circuitry to perform related functions/steps. The decision support system 510 may process a set of inputs including at least one of the following: a first input of a knowledge graph 512, a second input of an input query including a target entity 514; a third input of a dataset associated with the target entity 515. The decision support system 510 may output an approximated embedding 550 (e.g., from the embedding integrator 521), and/or a prediction 560. In the present disclosure, the term of "sub-system" does not limit how each sub-system is used or disposed; and neither any limitation on how each sub-system performs its function. One or more sub-system may work together as a larger system; or alternatively, each sub-system may be a standalone system, a standalone device, or a standalone apparatus to perform its function independently.

In various embodiments, the target entity 514 may be an entity not included or identifiable in the knowledge graph. The target entity 514 may be referred as an out-of-knowledge-graph entity.

As an output from the embedding approximator 530, the approximated embedding 550 may include an embedding vector (e.g., an approximated embedding vector) obtained by the embedding approximator for the target entity 514.

The prediction output 560 may include a plausibility prediction for a target triple involving the out-of-knowledge graph target entity 514.

Further referring to FIG. 5A, the link prediction sub-system 520 may include an optimized KG embeddings 516, which includes an optimized embedding vector for each entity and each link (or relation) in the knowledge graph. The optimized KG embeddings may form an embeddings space of k dimensions, wherein k is a positive integer. For some examples, k may be an integer within a range from a few hundreds to tens of thousands. Each embedding vector for an entity or link (or relation) in the knowledge graph may be a k-dimensional vector in the k-dimensional embeddings space. The embeddings space or optimized KG embeddings 516 of the knowledge graph may be trained and optimized in various manners, such as in a manner descried in U.S. Pat. No. 10,877,979 B2 granted on Dec. 29, 2020 and US Patent Application Publication No. 2021/0103826 A1 published on Apr. 8, 2021, which are herein incorporated by reference in their entireties. The optimized KG embeddings 516 may form another input to the embedding approximator 530.

Figure 5B:
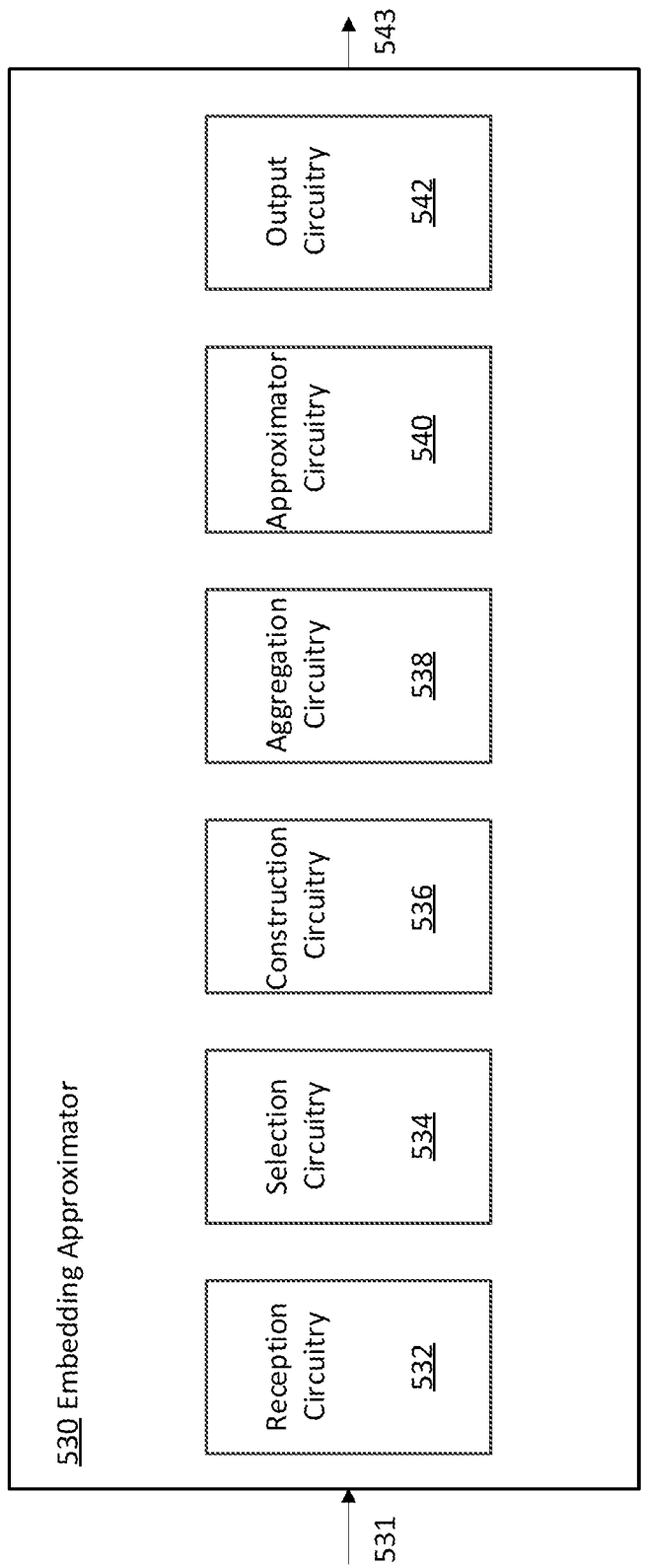
FIG. 5B is a block diagram illustrating an embodiment of an embedding approximator sub-system in FIG. 5A, in accordance with certain embodiments of the present disclosure.

Referring to FIG. 5B, the embedding approximator 530 may include a portion or all of the following circuities: a reception circuitry 532, a selection circuitry, 534, a construction circuitry 536, an aggregation circuitry 538, an approximator circuitry 540, and/or an output circuitry 542. In the present disclosure. One or more circuitry may work together as a larger circuitry or share some common components between one or more circuitry; or alternatively, each circuitry may be a standalone circuitry to perform its function independently.

The embedding approximator 530 may receive a set of input data 531, and/or output a set of output data 543. For example, in various embodiments, the set of input data may include at least one of the following: a knowledge graph 512, an optimized KG embeddings 516 of the knowledge graph, a target entity 514, and/or a dataset associated with the target entity 515, as shown in FIG. 5A. The set of output data may include at least one of the following: an approximated embedding 550 for the target entity and/or a prediction 560 for a target triple involving the target entity, as shown in FIG. 5A.

In some implementations, the embedding approximator may be domain-specific, wherein the embedding approximator is trained and/or constructed corresponding to a subset or a domain of the knowledge graph on specific topics/types of entities. For example, the embedding approximator may be specifically trained corresponding to a group of patients, a set of genes, or closely related diseases. In some other implementations, the embedding approximator may be global, wherein the embedding approximator is trained and/or constructed corresponding to multiple domains of the knowledge graph, an entire knowledge graph on multiple topics/entities, or multiple knowledge graphs.

Referring to step 110 in FIG. 1, the method 100 may include receiving, by a reception circuitry, a target entity, a dataset associated with the target entity, and an embeddings space of a knowledge graph comprising a set of structured data, wherein the target entity is out of the knowledge graph and the embeddings space includes a set of vectors representing the set of structured data associated with the knowledge graph in the embeddings space. The reception circuitry may include a portion or all of the execution circuitry 200 in FIG. 2, including a memory storing instructions and a processor in communication with the memory. The knowledge graph includes a set of triples including predicates between first nodes and second nodes, and the first and second nodes represent associated objects in the knowledge graph. The target entity is not included in the knowledge graph, and is to be assessed for its link plausibility with other known entities in the knowledge graph. The dataset associated with the target entity may include one or more triplets including the target entity.

The embeddings space may include a set of point coordinates representing the set of structured data in the embeddings space. In some implementations, referring to FIG. 5A, a link prediction sub-system may receive a knowledge graph (KG) and obtain an embeddings space for the knowledge graph.

The link prediction sub-system may include an embedding generation sub-system, which may be a neural network and/or may be referred as a knowledge graph embedding (KGE) model. The embedding generation sub-system may include an optimizer (e.g., stochastic gradient descent or any variant), a scoring function that assigns plausibility score to a fact (e.g., TransE, ComplEx, DistMult scoring functions), and a loss function that is minimized by the optimizer during training (e.g., pairwise margin-based, absolute margin, negative log-likelihood, self-adversarial functions, and etc.). For each element (node and/or edge) in the knowledge graph, the link prediction sub-system may generate a k-dimensional embedding vector that represents the element of the knowledge graph, wherein k is a positive integer. In one implementation, k may be 100. In another implementation, k may be 400 or 5000. The optimized KG embeddings, generated by the knowledge graph embedding circuitry, may be represented by vectors in the k-dimensional embeddings space.

For one example, the knowledge graph may include a portion or all of the knowledge graph 400 in FIG. 4, and/or the target entity may include an entity of Patient722. The triple of <Patient722, HasRelapse, Relapse> may be assessed for plausibility. The dataset associated with the target entity may include at least one triple of <Patient722, HasComorbidity, Dyslipidemia>, <Patient722, HasSmokingHistory, Smoking History>, and/or etc. (not shown in FIG. 4).

Referring to step 120 in FIG. 1, the method 100 may include selecting, by a selection circuitry, a set of elements from the knowledge graph, each element being related to the target entity according to the dataset associated with the target entity. The selection circuitry may include a portion or all of the execution circuitry 200 in FIG. 2, including a memory storing instructions and a processor in communication with the memory.

In some implementations, the selected elements from the knowledge graph may be related to the target entity, for example, as neighboring elements (or alternatively referred to as neighborhood elements) of the target entity, and the selection process may be based on the knowledge graph, the target entity, and the dataset associated with target entity.

Figure 6:
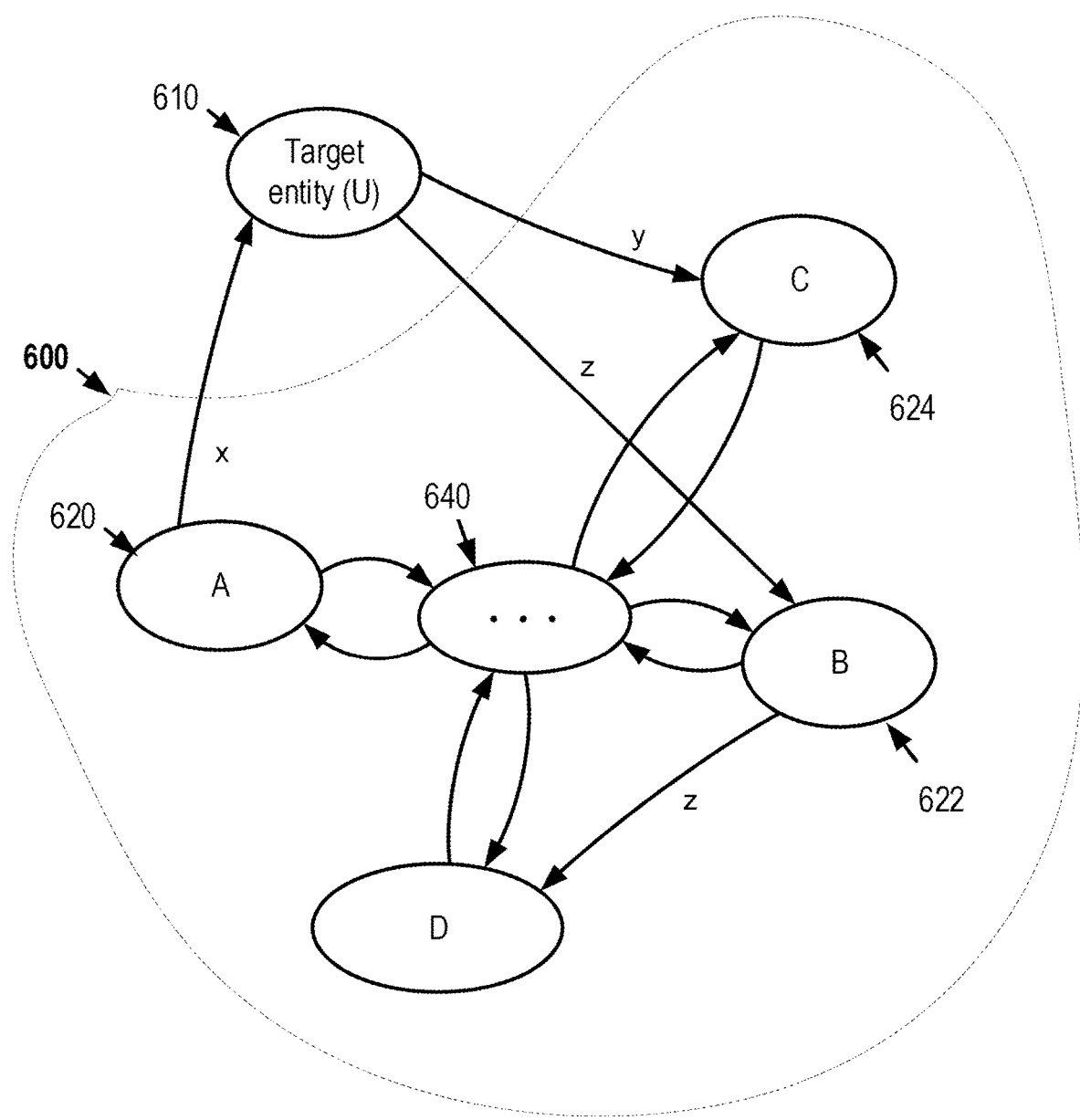
FIG. 6 is a schematic diagram illustrating a subgraph of knowledge graph associated with a target entity, in accordance with certain embodiments of the present disclosure.

As one example, FIG. 6 illustrates the step 120 using a knowledge graph 600 and a target entity (U) 610. The knowledge graph 600 may include multiple entities, e.g., entity A 620, entity B 622, entity C 624, and entity D 626, and may also include multiple links (or predicates), e.g., link x, link y, and link z. The knowledge graph 600 may also include other entities and/or subgraphs 640. In some implementations, a subgraph 640 may be the knowledge graph in FIG. 4, so that the knowledge graph 600 connects to the knowledge graph in FIG. 4.

In some implementations, the dataset associated with the target entity may include x, y, and z. Thus, the set of elements may be selected from the knowledge graph, according to the dataset associated with the target entity, to include x, y, z, A, B, and C.

In some implementations, the set of elements from the knowledge graph comprise a set of neighbor relations (alternatively referred to as neighboring relations or neighborhood relations) and a set of neighbor entities (alternatively referred to as neighboring entities or neighborhood entities). As one example, referring to FIG. 6, the set of neighbor relations may include x, y, and z; and the set of neighbor entities may include A, B, and C. Neighborhood entities of the target entity may, for example, include entities that are directly linked with the target entity. Neighborhood relation may refer to such direct linkage.

Referring to step 130 in FIG. 1, the method 100 may include constructing, by a construction circuitry, a set of descriptory triples based on the target entity and the set of neighborhood elements. The construction circuitry may include a portion or all of the execution circuitry 200 in FIG. 2, including a memory storing instructions and a processor in communication with the memory.

In some implementation, each of the descriptory triples comprises one element from the neighbor relations, one element from the neighbor entities, and the target entity. As one example, referring to FIG. 6, the set of descriptory triples may include the following: <A, x, U>, <U, z, B>, and <U, y, C>, wherein A, B, and C are known entities in the knowledge graph, and x, y, and z are predicates (or relations) in the knowledge graph.

In some other implementation, the set of descriptory triples may include a set of subjective descriptory triples and a set of objective descriptory triples. Each triple of the subjective descriptory triples comprises the target entity as a subject in the triple; and Each triple of the objective descriptory triples comprises the target entity as an object in the triple.

For the above example in FIG. 6, the set of subjective descriptory triples may include <U, z, B> and <U, y, C> because the target entity (U) is the subject in the triple <U, z, B> and the triple <U, y, C>. The set of objective descriptory triples may include <A, x, U> because the target entity (U) appears as the object in the triple <A, x, U>.

Referring to step 140 in FIG. 1, the method 100 may include obtaining, by an aggregation circuitry, an embedding matrix based on the descriptory triples and the embeddings space of the knowledge graph. The aggregation circuitry may include a portion or all of the execution circuitry 200 in FIG. 2, including a memory storing instructions and a processor in communication with the memory.

In some implementations, the embedding matrix may include m rows and n columns, m and n being positive integers. A value of n may be predetermined. For example, it may be predetermined as twice of k, the number of dimensions of the k-dimensional embeddings space for the knowledge graph. In some other implementations, a value for the number of columns of the embedding matrix m may be pre-determined. For example, the value of m may be pre-determined to be larger than or equal to a typical number of descriptory triples, for example, 10, 50, or 200.

In some implementations, the embedding matrix may include a first set of rows and a second set of rows. Each row of the first set of rows corresponds to a triple among the subjective descriptory triples and comprises an embedding of a corresponding predicate of the triple of the subjective descriptory triples and an embedding of a corresponding object of the triple of the subjective descriptory triples. Each row of the second set of rows corresponds to a triple among the objective descriptory triples and comprises an embedding of a corresponding subject of the triple of the objective descriptory triples and an embedding of an predicate of the triple of the objective descriptory triples.

For the above example in FIG. 6, the first set of rows may include two rows because the set of subjective descriptory triples includes two triples. A first row of the first set of rows of the embedding matrix may be {z's embedding vector, B's embedding vector} corresponding to the subjective descriptory triple of {U, z, B}; and a second row of the first set of rows of the embedding matrix may be {y's embedding vector, C's embedding vector} corresponding to the subjective descriptory triple of {U, y, C}.

In some implementations, the first row of the first set of rows of the embedding matrix, i.e., {z's embedding vector, B's embedding vector} in the above example, may constitute the most top row in the embedding matrix; and the second row of the first set of rows of the embedding matrix, i.e., {y's embedding vector, C's embedding vector} in the above example, may constitute the second most top row in the embedding matrix.

For the above example in FIG. 6, the second set of rows of the embedding matrix may include one row because the example set of objective descriptory triples includes only a single triple, and thus a third top row may include {A's embedding vector, x's embedding vector} corresponding to the subjective descriptory triple of <A, x, U>.

Under the circumstances that the pre-determined m is larger than a number of descriptory triples for a particular target entity, the remaining rows after the first set of rows and the second set of rows may be filled by padding data. In one implementation, the padding data may be all 0s. In another implementation, the padding data may be all 1s. In yet another implementation, the padding data may be pre-determined, for example, by a look-up table; or the padding data may be calculated according to a pre-determined formula.

In some other implementations, the first set of rows of the embedding matrix may not necessarily be the most top rows in term of location in the embedding matrix. Optionally, the first set of rows may be lower than the second set of rows and may be higher than the padding data in location in the embedding matrix. Alternatively, the first set of rows may be the bottom rows in the embedding matrix.

Referring to step 150 in FIG. 1, the method 100 may include generating, by an approximator circuitry, an approximated embedding for the target entity based on the embedding matrix. The approximator circuitry may include a portion or all of the execution circuitry 200 in FIG. 2, including a memory storing instructions and a processor in communication with the memory. The approximator circuitry is configured to execute an embedding estimation model comprising a set of model parameters.

In some implementations, the embedding estimation model may include a neural network including a set of model parameters, generating an approximated embedding for the target entity based on the embedding matrix.

In some other implementations, the embedding estimation model may include a pre-determined formula including a set of model parameters. the embedding estimation model may generate an approximated embedding for the target entity by performing a calculation according to the pre-determined formula based on the embedding matrix. For example, the pre-determined formula may include a polynomial function $P(x)$ with a power of p and may include (p+1) model parameters, wherein p is a positive integer and x indicates the embedding matrix.

In various embodiments, the method 100 may further include outputting, by an output circuitry, a plausibility prediction for the target entity based on the approximated embedding for the target entity. The output circuitry may include a portion or all of the execution circuitry 200 in FIG. 2, including a memory storing instructions and a processor in communication with the memory. The output circuitry may include a scoring function that assigns plausibility score to a fact (e.g., TransE, ComplEx, DistMult scoring functions), and a loss function that is used to have objective being minimized by optimizer during training (e.g., pairwise margin-based, absolute margin, negative log-likelihood, self-adversarial functions, and etc.). The prediction or plausibility prediction, generated by the output circuitry, may indicate a probability that the target triplet is a correct relation or statement.

In some implementations, the plausibility prediction for the target entity may include a plausibility prediction for a target triple including the target entity. For example, referring to FIG. 4, the target entity may be the out-of-knowledge-graph entity (Patient722); the target triple may be <Patient722, HasRelapse, Relapse>; and the plausibility prediction for the target entity may indicate a prediction of whether a cancer of Patient722 will relapse.

In various embodiments, the approximator circuitry is configured to execute an embedding estimation model comprising a set of model parameters, and the embedding estimation model may be pre-trained on the knowledge graph by regarding every entity or a subset of entities as "unknown" sample target entity and adjusting the set of model parameters of the embedding approximator or the embedding estimation model to minimize an error function based on a predicted approximated embedding vector and a "true" embedding vector of the "unknown" sample entity.

In some implementations, the pre-training method for the embedding approximator may include a portion or all of the following steps: for each sample target entity among a subset of the knowledge graph: generating a modified embeddings space for the knowledge graph with the sample entity excluded, identifying neighborhood elements of the sample entity in the knowledge graph, generating a neighborhood embedding matrix according to the modified embeddings space and the neighborhood elements, processing the neighborhood embedding matrix using the embedding estimation model to generate an approximated embedding for the sample target entity, and obtaining an estimation error based on the approximated embedding and a true embedding of the sample entity in the embeddings space of the knowledge graph without the target sample entity being excluded; and adjusting the set of model parameters of the embedding estimation model (or embedding approximator) by minimizing an overall error aggregated over the estimation error of each sample target entity in the knowledge graph.

In some other implementations, the pre-training method for the embedding approximator may include a portion or all of the following steps: for each sample entity or a sample subset of entities in the knowledge graph: generating a modified embeddings space for the knowledge graph with the sample entity or the sample subset of entities excluded, identifying neighborhood elements of the sample entity or the sample subset of entities in the knowledge graph, generating a neighborhood embedding matrix according to the modified embeddings space and the neighborhood elements, processing the neighborhood embedding matrix using the embedding estimation model to generate an approximated embedding for the sample entity or the sample subset of entities, and obtaining an estimation error based on the approximated embedding and a true embedding of the sample entity or the sample subset of entities in the embeddings space of the knowledge graph; and adjusting the set of model parameters of the embedding estimation model by minimizing an overall error aggregated over the estimation error of each sample entity or the sample subset of entities in the knowledge graph.

In some implementations, the embedding estimation model may be pre-trained by training on each sample entity in the whole knowledge graph, or by training on each sample entity in a smaller subset of the entities of the knowledge graph.

In some other implementations, when optimizing the set of model parameters of the embedding estimation model to minimize the estimation error, the optimization may occur firstly for each sample target entity, and then optimization is performed between every sample target entity in the subset of (or the whole) knowledge graph.

As one example, FIG. 7 describes an algorithm 700 illustrating a flow diagram for training an embedding estimation model. The algorithm may receive, as inputs, a knowledge graph (KG) and/or an optimized embeddings space (M) for the knowledge graph; and the algorithm may generate, as outputs, a pre-trained approximator.

Steps 1-8 includes steps for generating neighborhood embedding matrix (NEM) for an entity (e) based on an optimized embeddings space (M). Steps 9-14 includes steps for training the approximator by optimizing its parameters. The algorithm 700 may include a portion or all of the following steps.

Step 1: e is an target entity, and t(s, p, o) is a triple (subject, predicate, object).

Step 2: s_triples(e) as a set of subjective descriptory triples may be derived.

Step 3: o_triples(e) as a set of objective descriptory triples may be derived.

Step 4: descriptory_triples(e) includes the set of subjective descriptory triples and the set of objective descriptory triples may be formed for entity e.

Step 5: O(e, M) as a set of rows corresponding to the set of objective descriptory triples may then be generated.

Step 6: S(e, M) as a set of rows corresponding to the set of subjective descriptory triples may be generate Step 7 and Step 8: NEM as a neighbourhood emending matrix may be identified. The NEM(e, M) may include the set of rows corresponding to the set of objective descriptory triples; the set of rows corresponding to subjective descriptory triples, and the set of padded rows as described above.

Step 9: This step is optionally, and may be performed when the optimized embeddings space (M) is not provided, and the optimized embeddings space (M) is obtained by training a KGE model on the KG.

Step 10: for each sample entity (e) in the entities of the knowledge graph (KG entities), perform the following steps 11-1 to 13 for training the embedding approximator model.

Step 11-1: KG_e as a modified knowledge graph is generated with the descriptory_triples(e) removed from the knowledge graph.

Step 11-2: M_e as a modified embeddings space for the modified knowledge graph is retrained with the descriptor triple € removed.

Step 11-3: X is generated representing the neighborhood embedding matrix NEM(e, M_e), and y is denoted as $embed_M(e)$, which is a desired embedding vector for e, i.e., the true embedding vector for e.

Step 11-4: Approximator is defined as a function/model defined by a set of to-be-trained model parameters. The function/model has an input of known X and has an output of known y; and the set of to-be-trained model parameters is trained/learned with an optimization procedure with criterion described in steps 12-13.

Step 12: C as the criterion to minimize the estimation error between an approximated embedding vector for e output from the approximator and the "true" embedding vector for e in the knowledge graph may be established.

Step 13: the approximator is optimized until the criterion C is satisfied.

Step 14: the optimized approximator is returned as a pre-trained model for predicting embedding vectors in the embeddings space of the knowledge graph for an out-of-the-knowledge graph entity.

The present disclosure describes various embodiments that generating an approximated embedding of an out-of-knowledge-graph entity based on a knowledge graph and its embeddings. The various embodiments in the present disclosure may improve performance on the link prediction and extend capability of prediction to unseen entities beyond known entities. The various embodiments in the present disclosure may also provide an on-demand approximator that does not require an upfront full training. Other benefits of the various embodiments in the present disclosure may also include: training framework independent; backward compatibility with the models already trained (e.g., a deployed model in production); relational learning model agnostic, for example, wherein, if the knowledge graph's entities and relations have their embeddings available, unseen entities may be approximated and then a prediction is obtained for the unseen entities by treating them as known; and/or a simple approach based on the extended Firth's principle that an entity shall be known by the company it keeps (originally referring to words).

In the present disclosure, in some or all embodiments, a knowledge graph may refer to a set of entities and relations (or links) between these entities represented as a graph; a knowledge graph embedding may refer to an optimized set of vectors representing entities and links of a knowledge graph; a link prediction task may refer to a task for predicting plausibility of the missing link in the knowledge graph; a target triple may refer to a statement or fact that is subject to be evaluated for plausibility; a training step may refer to a step when a link prediction sub-system is optimized to source data, for example, the knowledge graph; and/or an inference/production step may refer to a step when an optimized link prediction system is used to predict plausibility of a single or a group of previously not seen links, which may be usually after training is finished.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives.

What is claimed is:

1. A computing device for generating an approximated embedding of an out-of-knowledge-graph entity based on a knowledge graph, the computing device comprising:
   a reception circuitry configured to receive a target entity, a dataset associated with the target entity, and an embeddings space of a knowledge graph comprising a set of structured data, wherein the set of structured data comprises a set of entities and links between the set of entities in the knowledge graph, wherein the target entity is out of the knowledge graph and the embeddings space includes a set of vectors representing the set of structured data associated with the knowledge graph in the embeddings space, and wherein the dataset associated with the target entity comprises data records of the target entity in triples stored in the knowledge graph;
   a selection circuitry configured to select a set of elements from the knowledge graph, each element being related to the target entity according to the dataset associated with the target entity;
   a construction circuitry configured to construct a set of descriptory triples based on the target entity and the set of elements, wherein the set of descriptory triples comprises the data records of the target entity, wherein each descriptory triple of the set of descriptory triples comprises the target entity, an entity selected from the set of elements, and a predicate obtained from the dataset associated with the target entity, and wherein the predicate defines a relational link between the target entity and the entity selected from the set of elements;
   an aggregation circuitry configured to obtain an embedding matrix based on the set of descriptory triples and the embeddings space, wherein the embedding matrix comprises a plurality of row vectors, wherein each row vector corresponds to a descriptory triple of the set of descriptory triples, wherein each row vector is formed by combining embeddings, retrieved from the embeddings space, of the target entity, the entity selected from the set of elements, and the predicate of the descriptory triple;
   an approximator circuitry configured to generate an approximated embedding for the target entity based on a pretrained embedding estimation model to the embedding matrix,
   wherein the approximated embedding indicates a vector representation corresponding to the target entity in the embeddings space of the knowledge graph; and
   an output circuitry configured to output a plausibility prediction of linkage between the target entity and one or more entities of the set of entities in the knowledge graph based on the approximated embedding for the target entity, wherein the plausibility prediction allows automatic integration of the target entity into the knowledge graph without retraining the embedding estimation model.

2. The computing device according to claim 1, wherein:
   the set of elements from the knowledge graph comprises a set of neighbor relations and a set of neighbor entities according to the dataset associated with the target entity; and
   each of the descriptory triples comprises one element from the set of neighbor relations, one element from the set of neighbor entities, and the target entity.

3. The computing device according to claim 1, wherein:
   the set of descriptory triples comprises a set of subjective descriptory triples and a set of objective descriptory triples;

each triple of the set of subjective descriptory triples comprises the target entity as a subject in the triple and a subject along with a link belonging to the knowledge graph with known embeddings; and each triple of the set of objective descriptory triples comprises the target entity as the object in the triple and the subject along with a link belonging to the knowledge graph with known embeddings.

4. The computing device according to claim 3, wherein:

the embedding matrix comprises a first set of rows and a second set of rows;

each row of the first set of rows corresponds to each triple of the set of subjective descriptory triples and comprises an embedding of the predicate of each triple of the set of subjective descriptory triples and an embedding of the object of each triple of the set of subjective descriptory triples; and each row of the second set of rows corresponds to each triple of the set of objective descriptory triples and comprises an embedding of the subject of each triple of the set of objective descriptory triples and an embedding of the predicate of each triple of the set of objective descriptory triples.

5. The computing device according to claim 1, wherein:

the embedding matrix comprising a matrix with m rows and n columns, m and n being positive integers; and a value of n is twice of a number of embedding dimensions of the embeddings space of the knowledge graph.

6. The computing device according to claim 1, wherein:

the embedding estimation model is pretrained by:

for each sample entity or a sample subset of entities in the knowledge graph:

generating a modified embeddings space for the knowledge graph with the sample entity or the sample subset of entities excluded, identifying neighborhood elements of the sample entity or the sample subset of entities in the knowledge graph, generating a neighborhood embedding matrix according to the modified embeddings space and the neighborhood elements, processing the neighborhood embedding matrix using the pretrained embedding estimation model to generate an approximated embedding for the sample entity or the sample subset of entities, obtaining an estimation error based on the approximated embedding and a true embedding of the sample entity or the sample subset of entities in the embeddings space of the knowledge graph; and adjusting a set of model parameters of the pretrained embedding estimation model by minimizing an overall error aggregated over the estimation error of each sample entity or the sample subset of entities in the knowledge graph.

7. A method for generating an approximated embedding of one or more out-of-knowledge-graph entity based on a knowledge graph, the method comprising:

receiving, by a reception circuitry, a target entity, a dataset associated with the target entity, and an embeddings space of a knowledge graph comprising a set of structured data, wherein the set of structured data comprises a set of entities and links between the set of entities in the knowledge graph, wherein the target entity is out of the knowledge graph and the embeddings space includes a set of vectors representing the set of structured data associated with the knowledge graph in the embeddings space, and wherein the dataset associated with the target entity comprises data records of the target entity in triples stored in the knowledge graph;

selecting, by a selection circuitry, a set of elements from the knowledge graph, each element being related to the target entity according to the dataset associated with the target entity;

constructing, by a construction circuitry, a set of descriptory triples based on the target entity and the set of elements, wherein the set of descriptory triples comprises the data records of the target entity, wherein each descriptory triple of the set of descriptory triples comprises the target entity, an entity selected from the set of elements, and a predicate obtained from the dataset associated with the target entity, and wherein the predicate defines a relational link between the target entity and the entity selected from the set of elements;

obtaining, by an aggregation circuitry, an embedding matrix based on the descriptory triples and the embeddings space, wherein the embedding matrix comprises a plurality of row vectors, wherein each row vector corresponds to a descriptory triple of the set of descriptory triples, wherein each row vector is formed by combining embeddings, retrieved from the embeddings space, of the target entity, the selected entity, and the predicate of the descriptory triple;

generating, by an approximator circuitry, an approximated embedding for the target entity based on a pretrained embedding estimation model to the embedding matrix, wherein the approximated embedding indicates a vector representation corresponding to the target entity in the embeddings space of the knowledge graph; and outputting, by an output circuitry, a plausibility prediction of linkage between the target entity and one or more entities of the set of entities in the knowledge graph based on the approximated embedding for the target entity, wherein the plausibility prediction allows automatic integration of the target entity into the knowledge graph without retraining the embedding estimation model.

8. The method according to claim 7, wherein:

the set of elements from the knowledge graph comprises a set of neighbor relations and a set of neighbor entities according to the dataset associated with the target entity; and each of the descriptory triples comprises one element from the set of neighbor relations, one element from the set of neighbor entities, and the target entity.

9. The method according to claim 7, wherein:

the set of descriptory triples comprises a set of subjective descriptory triples and a set of objective descriptory triples;

each triple of the set of subjective descriptory triples comprises the target entity as a subject in the triple and a link along with an object belonging to the knowledge graph with known embeddings; and each triple of the set of objective descriptory triples comprises the target entity as the object in the triple and the subject along with a link belonging to the knowledge graph with known embeddings.

10. The method according to claim 9, wherein:

the embedding matrix comprises a first set of rows and a second set of rows;

each row of the first set of rows corresponds to each triple of the set of subjective descriptory triples and comprises an embedding of the predicate of each triple of the subjective descriptory triples and an embedding of the object of each triple of the set of subjective descriptory triples; and each row of the second set of rows corresponds to each triple of the set of objective descriptory triples and comprises an embedding of the subject of each triple of the set of objective descriptory triples and an embedding of the predicate of each triple of the set of objective descriptory triples.

11. The method according to claim 7, wherein:

the embedding matrix comprising a matrix with m rows and n columns, m and n being positive integers; and a value of n is twice of a number of embedding dimensions of the embeddings space of the knowledge graph.

12. The method according to claim 7, wherein:

the embedding estimation model is pretrained by:

for each sample entity or a sample subset of entities in the knowledge graph:
generating a modified embeddings space for the knowledge graph with the sample entity or the sample subset of entities excluded,
identifying neighborhood elements of the sample entity or the sample subset of entities in the knowledge graph,
generating a neighborhood embedding matrix according to the modified embeddings space and the neighborhood elements,
processing the neighborhood embedding matrix using the pretrained embedding estimation model to generate an approximated embedding for the sample entity or the sample subset of entities,
obtaining an estimation error based on the approximated embedding and a true embedding of the sample entity or the sample subset of entities in the embeddings space of the knowledge graph; and
adjusting a set of model parameters of the pretrained embedding estimation model by minimizing an overall error aggregated over the estimation error of each sample entity or the sample subset of entities in the knowledge graph.

13. A non-transitory computer-readable storage medium storing computer-readable instructions, wherein, the computer-readable instructions, when executed by a processor, are configured to cause the processor to perform:

receiving a target entity, a dataset associated with the target entity, and an embeddings space of a knowledge graph comprising a set of structured data, wherein the set of structured data comprises a set of entities and links between the set of entities in the knowledge graph, wherein the target entity is out of the knowledge graph and the embeddings space includes a set of vectors representing the set of structured data associated with the knowledge graph in the embeddings space, and wherein the dataset associated with the target entity comprises data records of the target entity in triples stored in the knowledge graph;

selecting a set of elements from the knowledge graph, each element being related to the target entity according to the dataset associated with the target entity;

constructing a set of descriptory triples based on the target entity and the set of elements, wherein the set of descriptory triples comprises the data records of the target entity, wherein each descriptory triple of the set of descriptory triples comprises the target entity, an entity selected from the set of elements, and a predicate obtained from the dataset associated with the target entity, and wherein the predicate defines a relational link between the target entity and the entity selected from the set of elements;

obtaining an embedding matrix based on the set of descriptory triples and the embeddings space, wherein the embedding matrix comprises a plurality of row vectors, wherein each row vector corresponds to a descriptory triple of the set of descriptory triples, wherein each row vector is formed by combining embeddings, retrieved from the embeddings space, of the target entity, the entity selected from the set of elements, and the predicate of the descriptory triple;

generating an approximated embedding for the target entity based on a pretrained embedding estimation model to the embedding matrix, wherein the approximated embedding indicates a vector representation corresponding to the target entity in the embeddings space of the knowledge graph; and outputting a plausibility prediction of linkage between the target entity and one or more entities of the set of entities in the knowledge graph based on the approximated embedding for the target entity, wherein the plausibility prediction allows automatic integration of the target entity into the knowledge graph without retraining the embedding estimation model.

14. The non-transitory computer-readable storage medium according to claim 13, wherein:

the set of elements from the knowledge graph comprises a set of neighbor relations and a set of neighbor entities; and each of the descriptory triples comprises one element from the neighbor relations, one element from the set of neighbor entities, and the set of target entity.

15. The non-transitory computer-readable storage medium according to claim 13, wherein:

the set of descriptory triples comprises a set of subjective descriptory triples and a set of objective descriptory triples;

each triple of the set of subjective descriptory triples comprises the target entity as a subject in the triple and a link along with an object belonging to the knowledge graph with known embeddings; and each triple of the set of objective descriptory triples comprises the target entity as the object in the triple and the subject along with a link belonging to the knowledge graph with known embeddings.

16. The non-transitory computer-readable storage medium according to claim 15, wherein:

the embedding matrix comprises a first set of rows and a second set of rows;

each row of the first set of rows corresponds to each triple of the set of subjective descriptory triples and comprises an embedding of the predicate of each triple of the subjective descriptory triples and an embedding of the object of each triple of the set of subjective descriptory triples; and each row of the second set of rows corresponds to each triple of the set of objective descriptory triples and comprises an embedding of the subject of each triple of the set of objective descriptory triples and an embedding of the predicate of each triple of the objective descriptory triples.

17. The non-transitory computer-readable storage medium according to claim 13, wherein:

the embedding matrix comprising a matrix with m rows and n columns, m and n being positive integers; and a value of n is twice of a number of embedding dimensions of the embeddings space of the knowledge graph.

* * * * *